United States Patent
Huber et al.

(10) Patent No.: US 9,841,288 B2
(45) Date of Patent: Dec. 12, 2017

(54) PACKAGED TOURS WITH TURN-BY-TURN NAVIGATION

(75) Inventors: Chester A. Huber, Grosse Point Farms, MI (US); Nebojsa Nedeljkovic, Birmingham, MI (US); Richard A. Johnson, Rochester Hills, MI (US); Laurence J. Tretyak, Highland, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 1480 days.

(21) Appl. No.: 11/618,424

(22) Filed: Dec. 29, 2006

(65) Prior Publication Data

US 2008/0162042 A1    Jul. 3, 2008

(51) Int. Cl.
- *G01C 21/34* (2006.01)
- *G08G 1/0962* (2006.01)
- *G08G 1/0969* (2006.01)
- *G01C 21/36* (2006.01)
- *G08G 1/0968* (2006.01)

(52) U.S. Cl.
CPC ....... *G01C 21/343* (2013.01); *G01C 21/3679* (2013.01); *G08G 1/0962* (2013.01); *G08G 1/096811* (2013.01); *G01C 21/3644* (2013.01); *G01C 21/3682* (2013.01); *G08G 1/0969* (2013.01); *G08G 1/096827* (2013.01)

(58) Field of Classification Search
CPC ............. G01C 21/343; G01C 21/3629; G01C 21/3626; G01C 21/3679; G01C 21/3611; G01C 21/3682; G01C 21/3644; G01C 21/3605; G01C 21/3697; G08G 1/0962; G08G 1/096811; G08G 1/096827; G08G 1/0969; G08G 1/096838; G08G 1/096872

USPC ........ 701/200–202, 209–211, 410, 418, 419, 701/425, 431, 438, 440, 441; 340/995.19–995.27

See application file for complete search history.

(56) References Cited

U.S. PATENT DOCUMENTS

| | | | | |
|---|---|---|---|---|
| 5,442,557 A | * | 8/1995 | Kaneko ............. | G01C 21/3632 340/990 |
| 5,614,898 A | * | 3/1997 | Kamiya et al. .......... | 340/995.24 |
| 5,794,164 A | * | 8/1998 | Beckert .................. | B60R 11/02 455/3.06 |
| 5,802,492 A | * | 9/1998 | DeLorme et al. ......... | 455/456.5 |
| 5,924,075 A | * | 7/1999 | Kanemitsu ....................... | 705/6 |

(Continued)

FOREIGN PATENT DOCUMENTS

KR    2002/0083749 A  *  11/2002
WO    WO-0120576 A2  *  3/2001    .......... G08G 1/0962

Primary Examiner — Chuong P Nguyen

(74) Attorney, Agent, or Firm — Leydig, Voit & Mayer, Ltd.

(57) ABSTRACT

An improved guidance system and method provide a packaged tour object having tour directions and media related to points of interest of a tour for playing via a telematics unit. A user is provided, via their telematics unit, with specific directions to access points of interest of the tour in a certain sequence, while the telematics unit optionally conveys media content to the user at appropriate points. The media content may be keyed to an upcoming site, and may comprise audio and/or visual information. In addition, user convenience information such as parking and ticketing information may be contained ion the packaged tour object for presentation via the telematics unit.

12 Claims, 7 Drawing Sheets

(56) References Cited

U.S. PATENT DOCUMENTS

| | | | | |
|---|---|---|---|---|
| 6,009,403 | A * | 12/1999 | Sato | 705/6 |
| 6,154,689 | A * | 11/2000 | Pereira | G01C 21/343 |
| | | | | 340/993 |
| 6,188,956 | B1 * | 2/2001 | Walters | G01C 21/3673 |
| | | | | 340/990 |
| 6,266,614 | B1 * | 7/2001 | Alumbaugh | 701/468 |
| 6,421,607 | B1 * | 7/2002 | Gee | G01C 21/3629 |
| | | | | 340/988 |
| 6,446,002 | B1 * | 9/2002 | Barton | 701/211 |
| 6,477,460 | B2 * | 11/2002 | Kepler | 701/209 |
| 6,526,351 | B2 * | 2/2003 | Whitham | 701/438 |
| 6,542,814 | B2 * | 4/2003 | Polidi | G01C 21/3682 |
| | | | | 340/990 |
| 7,130,742 | B2 * | 10/2006 | Kobuya | G01C 21/20 |
| | | | | 340/988 |
| 7,463,977 | B2 * | 12/2008 | Price et al. | 701/438 |
| 7,647,166 | B1 * | 1/2010 | Kerns | 701/207 |
| 2002/0011951 | A1 * | 1/2002 | Pepin et al. | 342/357.13 |
| 2002/0091793 | A1 | 7/2002 | Sagie | |
| 2003/0083806 | A1 * | 5/2003 | Odinak | G01C 21/343 |
| | | | | 701/420 |
| 2003/0083807 | A1 * | 5/2003 | Kuroda | G01C 21/362 |
| | | | | 701/468 |
| 2003/0206121 | A1 * | 11/2003 | Tretyak, Jr. | 340/995.19 |
| 2004/0070602 | A1 * | 4/2004 | Kobuya et al. | 345/738 |
| 2004/0078813 | A1 * | 4/2004 | Kobuya et al. | 725/46 |
| 2005/0065717 | A1 * | 3/2005 | Mueller et al. | 701/201 |
| 2006/0015249 | A1 * | 1/2006 | Gieseke | G01C 21/3415 |
| | | | | 701/416 |
| 2010/0094543 | A1 * | 4/2010 | Friedenthal | G01C 21/343 |
| | | | | 701/533 |
| 2012/0209524 | A1 * | 8/2012 | Okude | G01C 21/3492 |
| | | | | 701/540 |

\* cited by examiner

PACKAGED TOURS WITH TURN-BY-TURN NAVIGATION

TECHNICAL FIELD

The invention relates generally to navigation, and more particularly relates to a system and method for providing a packaged tour to a vehicle user via a vehicle telematics unit.

BACKGROUND OF THE INVENTION

Although vehicles have many important uses in both leisure and industrial environments, recreational uses have long been an important part of vehicle utilization. With respect to on-road vehicles, one important recreational use is touring. A tour differs from a trip in that a tour involves a number of different destinations, often in a single region and often of a similar type. For example, a user may wish to take his or her family on a tour of a set of points of interest, e.g., historically significant sites in downtown Montgomery, Ala.

Today, in order to engage in such a tour by road vehicle, the user needs to use a guidebook or other informational source to identify the points of interest and then navigate manually to each point via a map, etc. However, it is difficult for the user to simply and quickly know the most appropriate route and sequence for visiting the various points of interest. Moreover, the guidebook or other information source is not linked to the user's progress, so that if the user wants information regarding a current or next point of interest, the user is required to find and reference appropriate material during a stop or during travel, e.g., by a passenger.

Thus, while touring enjoys widespread popularity, the present techniques used to facilitate touring provide a number of disadvantages.

BRIEF SUMMARY OF THE INVENTION

While aspects of the invention will be discussed in detail below, this brief summary of the disclosure provides an overview of certain elements of the described examples.

In a number of examples of the invention, vehicle telematics users are provided with a system of tour direction that allows additional utility and convenience over past methods. For example, when user desires to take a 'tour' of a set of points of interest, the user is provided, via their telematics unit, with specific directions to access the points of interest in a certain sequence. The telematics unit may also display media content to the user. The media content may be keyed to an upcoming site, and may comprise audio and/or visual information. For example, a narrated slide show or movie may illustrate certain aspects of interest, e.g. historical facts, hidden features, etc., of the site. In addition, user convenience information such as parking and ticketing information may be presented via the telematics unit for the user's convenience.

Other objects and advantages of the invention will become apparent upon reading the following detailed description and upon reference to the drawings.

DESCRIPTION OF AN EXEMPLARY EMBODIMENT

Before describing the invention in detail, an exemplary environment in which the invention may operate will be described. It will be appreciated that the described environment is for purposes of illustration only, and does not imply any limitation regarding the use of other environments to practice the invention.

Figure 1:
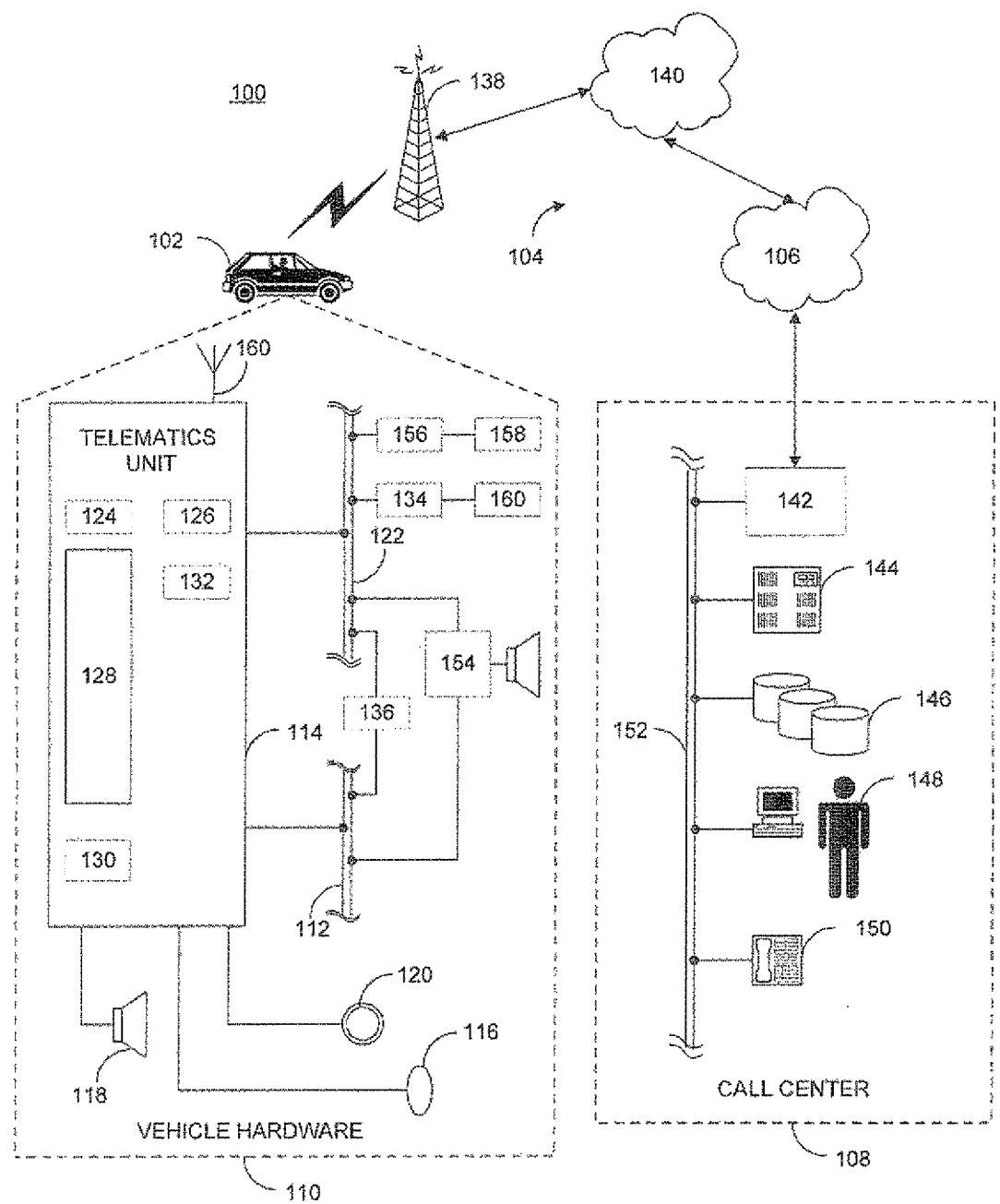
FIG. 1 is a schematic view of an example communication system within which examples of the present invention may be used.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100, however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, videogames and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 will include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic pushbutton used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 160, connected to various sensor interface modules 134 are operatively connected to the vehicle bus 122. Examples vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber of other optical network, a cable network, other wireless networks such as wireless local networks (WLANs) or networks providing broadband wireless access (BWA), or any combination thereof.

Call center 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The methods of the following examples are ideally employed in an environment including a telematics-equipped vehicle and wholly or partially wireless communications infrastructure as described above by reference to FIG. 1. It will be appreciated that the illustration of FIG. 1 describes an exemplary system, and that many of the elements of FIG. 1 are not essential to the operation of the invention described in the various examples herein. The steps of the method that are performed remotely to the vehicle and the telematics unit may be performed by any appropriate device or facility, but in one example, the process is executed at the call center 108.

As discussed above, a telematics user driving a vehicle may wish to engage in a tour of sites of interest, e.g., a set of historical sites in a city. Whereas in the past the user was required to synthesize information from a number of sources, e.g., a guidebook and map, the invention provides the user with a packaged tour presentation whereby navigation instructions for the tour are generated automatically and downloaded to the vehicle telematics unit. Additionally, other information such as audio and/or visual information may be generated or collected and downloaded as well.

Figure 2A:
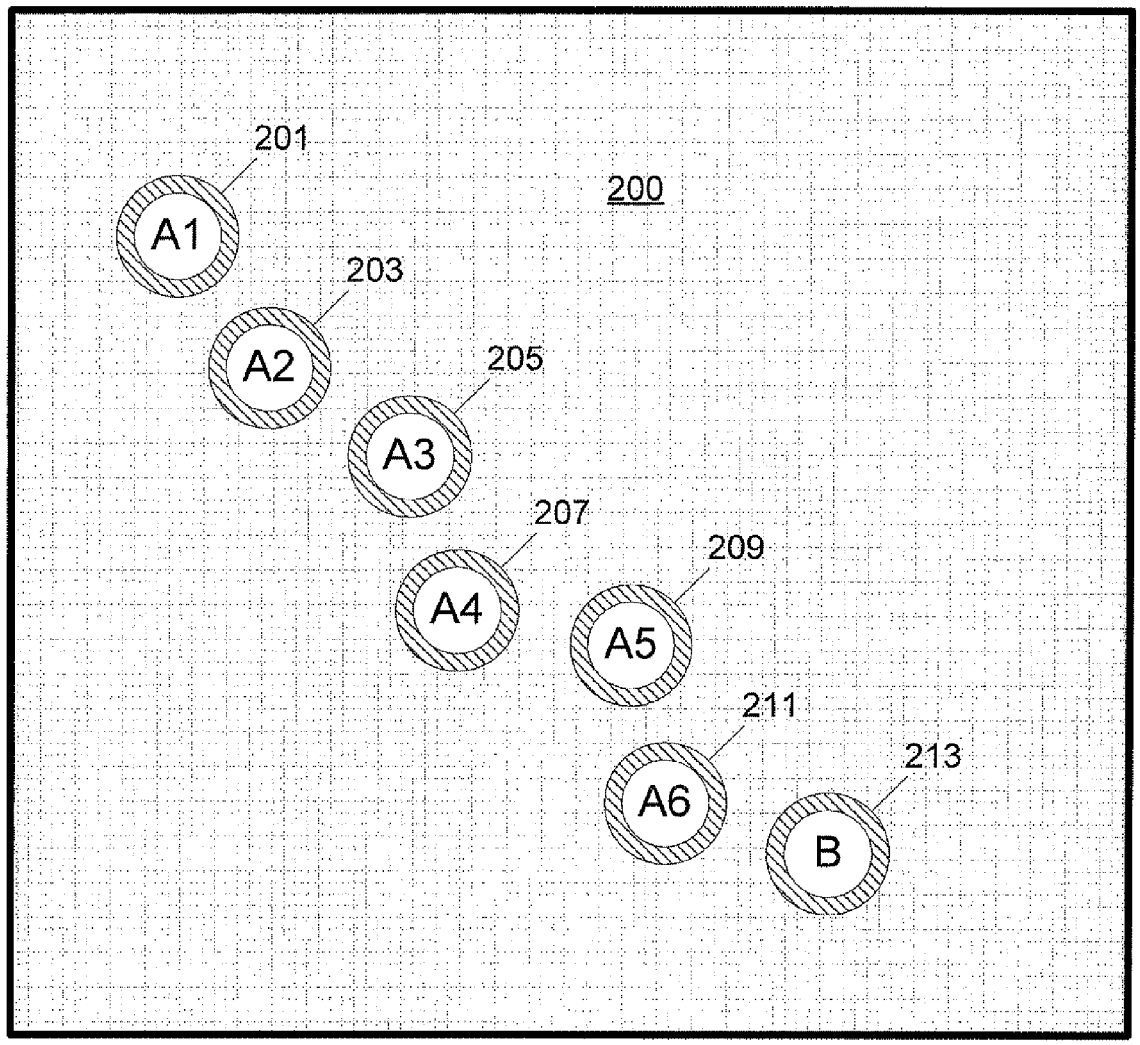
FIG. 2 is an abstract data diagram illustrating a PRL structure usable in conjunction with certain of the disclosed examples.
Figure 2B:
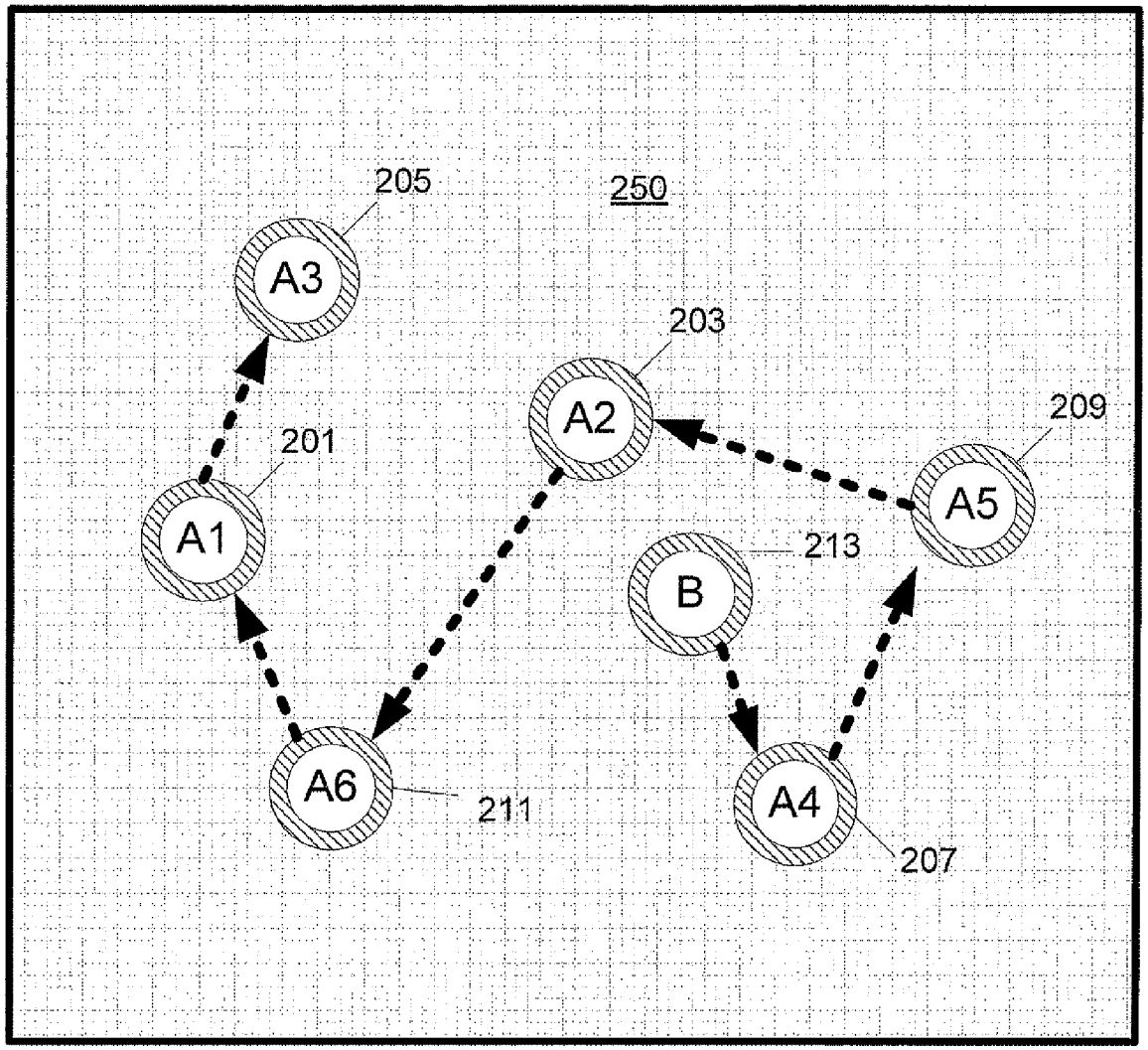

FIG. 2A is an exemplary map structure 200 showing a collection of points $A_1$(201), $A_2$(203), $A_3$(205), $A_4$(207), $A_5$(209), and $A_6$(211). These points $A_1$-$A_6$ (201-211) represent points of interest to be visited during a tour. In addition, the map structure 200 comprises point B (213), which is a starting point where the user (i.e., the user's telematics unit) is currently located. Although the routing from point B (213) to point A1 and then among the various points of interest $A_1$-$A_6$ (201-211) is straightforward, this need not always be true. For example, referring to the exemplary map structure 250 of FIG. 2B, the points of interest $A_1$-$A_6$ (201-211) do not lie on a straight line, nor do all points of interest lie to one side of the starting point B (213). Although it is possible to identify which points of interest $A_1$-$A_6$ (201-211) lie closest to point B (213), this may not always be the best point to visit first. Rather, both the first point and the sequence of visits are calculated in an example of the invention by considering the user's predetermined routing instructions, if any.

The tour instructions and media may be stored and transferred in any suitable format; however, in an example of the invention, the tour is packaged as an object. In a further example, the tour package object is an object according to an object oriented programming model such as COM.

Figure 3:
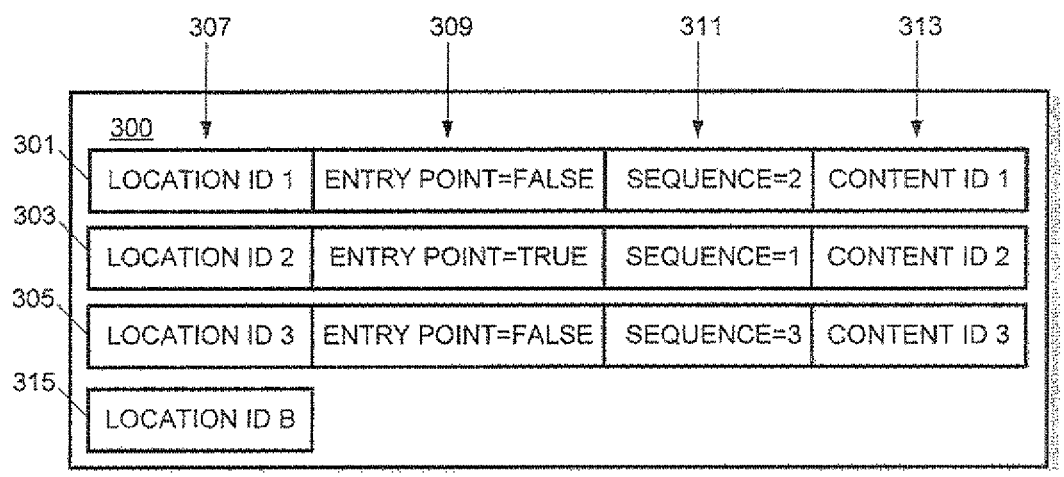
FIG. 3 is a flow chart illustrating a method of determining and loading a PRL according to an example of the invention.

FIG. 3 is an object illustration showing an exemplary tour object 300 according to one example of the invention. The tour object 300 describes multiple geographic points, the starting point and sequence of traversal, and any media content associated with each point. In greater detail, the tour object 300 contains at least two target locations 301, 303, 305. In an example of the invention, the target locations comprise target location identifiers 307 which are geocoded addresses on a digital map.

The target locations 301, 303, 305 of the tour object 300 may also have several other properties. For example, an entry point property (309) identifies the location as being an entry point or as not being an entry point. In an example, this is signified via a value that set at either TRUE or FALSE.

Further, a sequence property (311) optionally identifies a specific sequence in which the sites (locations) are to be visited. The sequence number is simply specified as a number selected from 1-N for a tour of N locations. Thus, in the illustrated example, the sequence numbers are selected as 1, 2, or 3. In a further example, this property can be set to NULL, indicating no sequence preference.

A media property (313) provides a media content identifier, e.g., to locate audio, visual, and/or textual material that is to be played in connection with directing the user to that location. For example, the media may be played when embarking on the leg of the tour ending at the location, or may be played as the vehicle approaches the location. The content identifier of the media property 313 may identify a local or remote source of content, e.g., a URL or a local memory address.

In a further example, the tour object 300 provides additional information of use to the user. This additional information may be identified via the media property 313 or may be identified elsewhere in tour object 300. Examples of additional information include parking information, ticket information, hours of operation of a particular attraction, and so on.

The tour object also contains a current location object that identifies the user's starting point (Location B) 315. As with the target location identifiers 307, the Location B ID 315 may be a geocoded address on a digital map. The Location B ID 315 may be automatically calculated based on GPS data from the user's telematics unit in an example of the invention.

In another example, the Location B ID 315 is based on a user-specified starting point. For example, a user may request the tour package (encapsulated by the tour object 300) at a time well in advance of needing the information. For example, the user may plan to take a trip to a first destination and then start the tour from there. In this instance, the user would specify the first destination as the starting point 315 for the tour object 300.

Although the tour object may be calculated and transferred in any number of ways, in one example, the tour object 300 is calculated at a call center such as call center 108 based on a user request received from the user telematics unit. The tour object 300 is then transferred to the user telematics unit.

Figure 4:
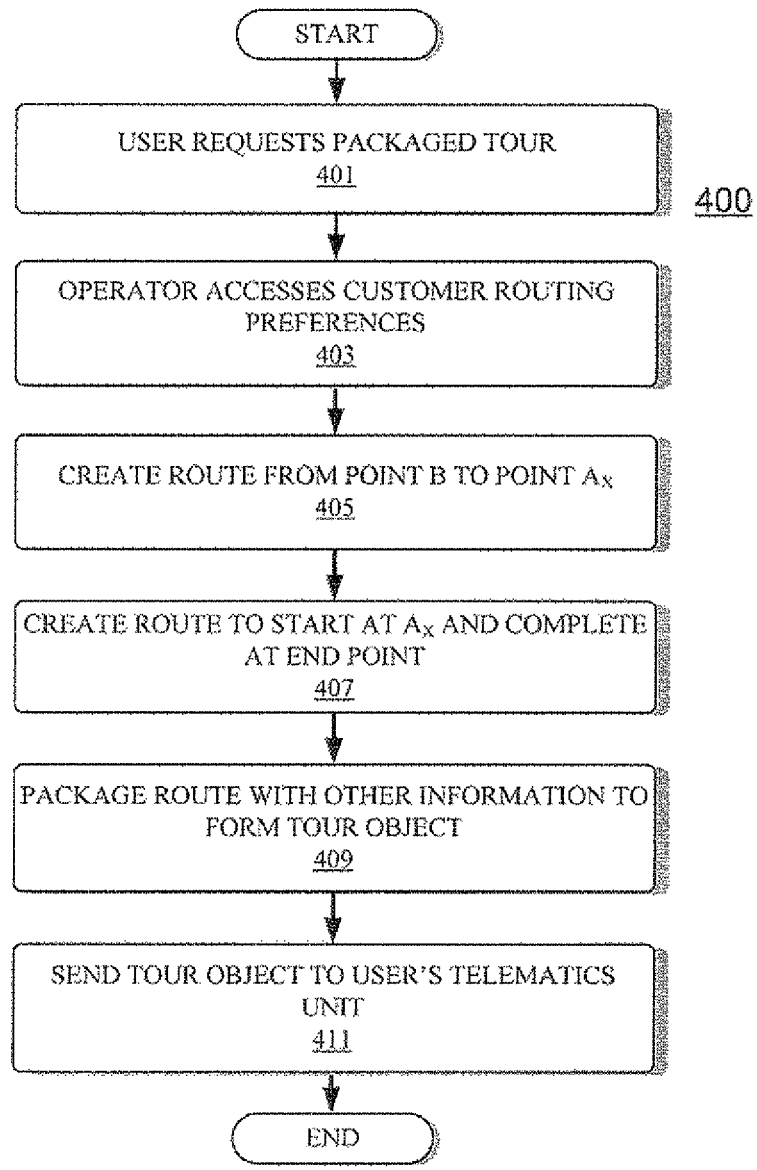
FIG. 4 is a flow chart illustrating a process of determining an appropriate PRL for loading onto the telematics unit within an example of the invention.

FIG. 4 is a flow chart illustrating a method for receiving and processing such a request in one example of the invention. At stage 401 of the process 400, the user calls a packaged tour operator and requests a packaged tour. The request may be made in advance via a personal computer or other networked device, or may be made from the user's telematics unit. If the request is made from a computing device other than the telematics unit, then the download described below may be either to the telematics unit or to the other computing device for transfer, e.g., via a disk or thumb drive, to the telematics unit.

The request may specify the tour object contents, e.g., the sites of interest, via any suitable mechanism, but in one example, the user selects from among packages presented by the tour operator. The tour package may also comprise billing information if the tour service is not a free service provided to the user.

At stage 403, the operator accesses the customer routing preferences, if any. The routing preferences may have been previously specified by the user, or may be specified as part of the request or in a separate transmission, or may be undefined. If the user preferences are undefined, the operator uses a default set of routing preferences instead.

The process first creates a route from point B to point $A_x$ at stage 405, where $A_x$ is an optimal starting point of the tour object based on customer or default routing preferences. Parameters that may be used to determine the best starting point include the distance between the user's starting point and each target site, the routing available between the between the user's starting point and each target site, the distance between each target site and each potential next site, and the routing available between each site and each potential next site. In addition, the process may consider a user preference for an ending point. For example, if the user who is away from home lives closest to one of the target sites, that site may be a desirable ending point.

Figure 5:
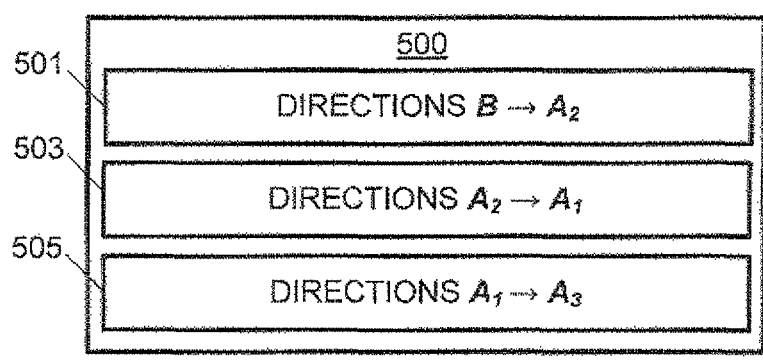
FIG. 5 is an abstracted map view of a route, identifying directions to travel from point B to $A_3$.

Based on these considerations, the process creates in stage 407 a route that will start at $A_x$ and complete at a selected or calculated end point. In an example of the invention, if the user deviates from the route, the affected portion of the route may be recalculated. FIG. 5 is an abstracted view of a route 500, identifying the directions needed to travel from point B to $A_2$ (501), $A_2$ to $A_1$ (503), and $A_1$ to $A_3$ (505), assuming an order for ($A_1$, A2, A3) of (2, 1, 3).

In stage 409, the created route is packaged with other information to form a tour object, e.g., tour object 300 discussed above. Each point $A_n$ of the route may have variable initial maneuver properties attached to it, meaning that the initial maneuver to begin the route between points is not critical, and the directions incorporate additional information to accommodate slight variations in the initial maneuver. The tour object is sent to the user's telematics unit in stage 411. Typically, this transmission will occur over the system 100 described above, but other communications networks or systems may be used instead. After stage 411, the process terminates.

The mechanism by which the route is chosen is not critical, but in an example of the invention, the mechanism takes as input any routing preferences as well as the known distances between the sites of the tour. Without considering the routing preferences, algorithms are known in the art to minimize travel distance to arrive at each of a selection of sites. It should be noted that the distance between points is not necessarily the GPS distance, but instead should account for the direction, type, and interconnection of roadways. If the routing preferences are weighted at zero, then the route is planned as per these known algorithms.

If the routing preferences are weighted at something other than zero, then the actual travel distances between points may be weighted according to these preferences. Thus, if the routing preferences specify that highways are preferred to local roads, then the highway portions of the route may be weighted at 0.9 and the local road portions may be weighted at 1.2 for example. After weighting, use of known routing algorithms to select among weighted distances provides in one example a route that accounts for both actual distance as well as routing preferences. Any other suitable mechanism for accounting for routing preferences may be used as well, and the selection of any particular method is not critical.

Figure 6:
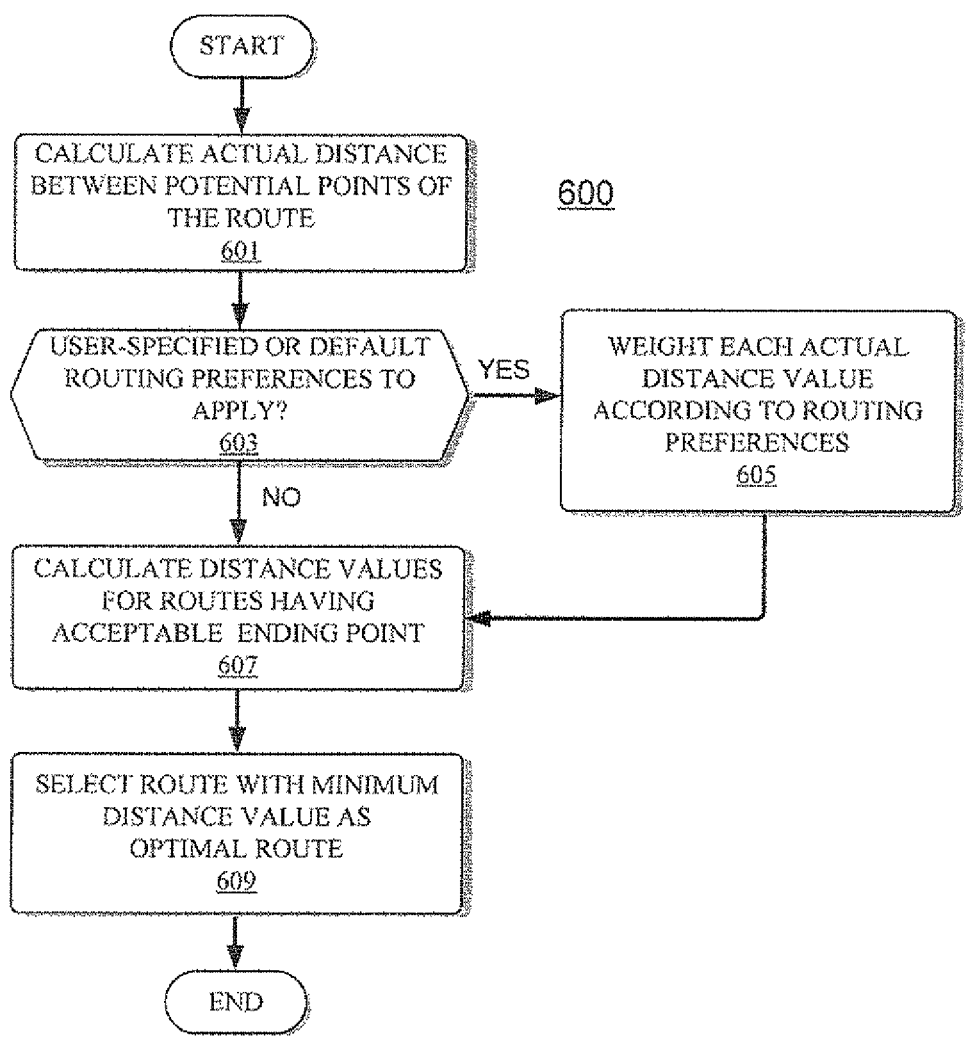
FIG. 6 illustrates a flow chart of an example process for calculating a route in accordance with an example of the invention.

The flow chart of FIG. 6 illustrates an example process for calculating a route in accordance with the foregoing principles, although other mechanisms usable within the invention will be appreciated by those of skill in the art given the teachings herein. At stage 601 of process 600, the process calculates the actual distance between the potential points of the route, including the starting point. Thus, in an array of 7 points (e.g., 6 sites plus an actual or user-specified starting point), there are approximately 21 (6+5+4+3+2+1) legs or distance values to calculate.

In stage 603, the process determines whether there are any user-specified or default routing preferences to apply. If there are, the process weights each actual distance value according to the routing preferences at stage 605. Otherwise, the process flows immediately to stage 607. Subsequently, at stage 607, the process 600 accounts for any specified preferred ending point by calculating the weighted distance values (or unweighted if no preferences) for those routes having the desired ending point. Of these routes, the minimum is selected in stage 609 as the optimal routing between all points to minimize the overall weighted distance while respecting any specified ending point. After stage 609, the process 600 terminates.

The user interaction with the downloaded tour object is executed via the user interface of the telematics unit 114, such as via the microphone 116, speaker 118 and buttons and/or controls 120 connected to the telematics unit 114. In one example, the directions and media and other information related to the tour object are provided to the user via audio directions, and the user interacts with the system via spoken commands or push buttons or other controls. The audio directions and other information may be triggered by GPS readings or may be played and replayed via spoken or other commands.

In a particular example, the user is able to skip a particular site of the tour by issuing a "skip next" command. This command may be spoken or otherwise input to the system. Other commands, such as "Previous Point," "Repeat Directions," "Alternate Route," and so on may also be made available as will be appreciated by those of skill in the art.

It will be appreciated that the foregoing methods and implementations for tour object generation, provision, and use are merely examples, and that these illustrate a preferred technique. However, it is contemplated that other implementations of the invention may differ in detail from foregoing examples. As noted earlier, all references to the invention are intended to refer only to the example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e. meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing a vehicle-based packaged tour object to a telematics unit insulted within a vehicle and operatively coupled to an infotaimnent center of the vehicle for presentation of downloaded audiovisual content corresponding to target locations represented in the packaged tour object to an occupant of the vehicle, the method comprising:

issuing a request to a packaged tour object server to provide the vehicle-based packaged tour object, the request including a starting point for the vehicle-based packaged tour object;

receiving, by the telematics unit, the vehicle-based packaged tour object, the vehicle-based packaged tour object comprising a data structure including:

the starting point of the vehicle-based packaged tour object, and a target location list structure comprising target location structures corresponding to the target locations represented in the packaged tour object, each target location structure comprising:

a sequence property identifying a relative order of visitation of a target location in relation to other ones of the target locations represented within the target location list, and a media property providing a media content identifier referencing audiovisual materials downloadable for presentation via, the infotaimnent center of the vehicle;

creating a route for vehicle travel, wherein the route is based upon:

relative geographic location of each of the target locations represented in the target location list, and wherein each target location corresponds to a geographic point through which the route is required to pass; and vehicle travel routing preferences;

processing, by the telematics unit after the creating, the vehicle-based packaged tour object and the route for vehicle travel, wherein during the processing, the telematics unit performs the operations of:

presenting navigation instructions to vehicle occupants in accordance with the route for vehicle travel, and presenting, via the infotainment center in connection with presenting the navigation instructions to a next one of the list of target locations according to the route for vehicle travel, audiovisual materials referenced by the media property of the target location structures of the target location list structure, such that each media object conveys information regarding the specific feature of interest of the respective geographic point.

2. The method according to claim 1, wherein the audiovisual materials include information regarding a target location.

3. The method according to claim 1, wherein the media property comprises information identifying a storage location from which the audiovisual materials for the target location can be obtained.

4. The method according to claim 3, wherein the media property comprises a URL.

5. The method according to claim 1, wherein the vehicle-based packaged tour object further includes audiovisual materials presented on the infotainment center.

6. The method according to claim 1, wherein the sequence property is a sequence number.

7. The method according to claim 1, wherein creating the route for vehicle travel comprises:

calculating a travel distance between each target location represented in the target location list;

weighting each such travel distance in accordance with the vehicle travel routing preferences;

calculating a route length for each acceptable route using the weighted travel distances; and determining, after the calculating a route length for each acceptable route, a route having a minimum route length.

8. The method according to claim 7, wherein the request to provide the vehicle-based packaged tour object identifies a desired ending point, and wherein the calculating a route length for each acceptable route using the weighted travel distances comprises calculating a route length for each route ending at the desired ending point.

9. The method of claim 1 wherein the target location structure further comprises:

an additional information reference providing supplemental information relating to a target location.

10. The method of claim 9 wherein the additional information rides parking information.

11. The method of claim 9 wherein the additional information includes ticket information.

12. The method of claim 9 wherein the additional information includes hours of operation information.

* * * * *